April 3, 1934. G. WALTHER 1,953,321

WHEEL

Filed Jan. 21, 1929  3 Sheets-Sheet 1

Inventor:
GEORGE WALTHER,
BY
Attorneys

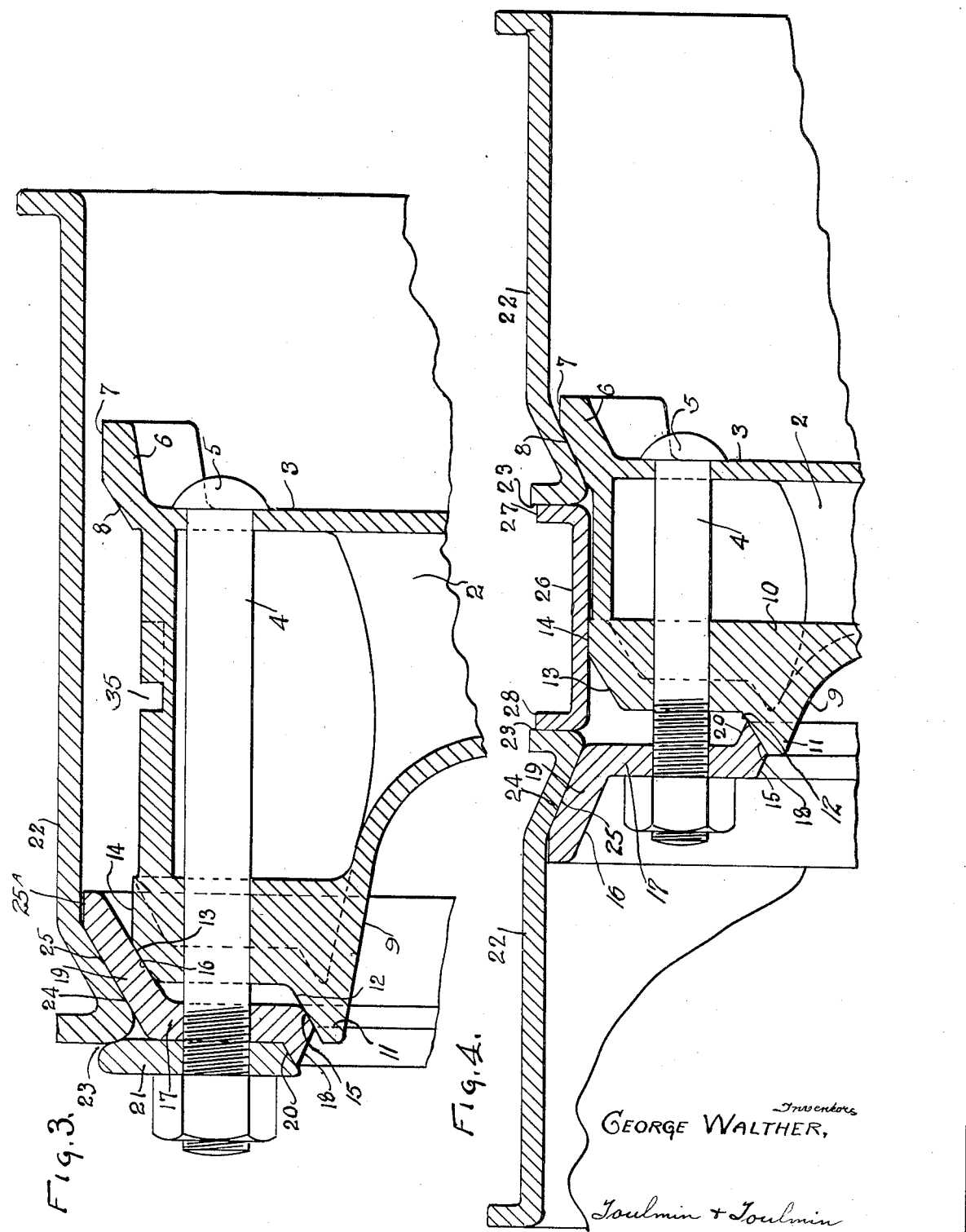

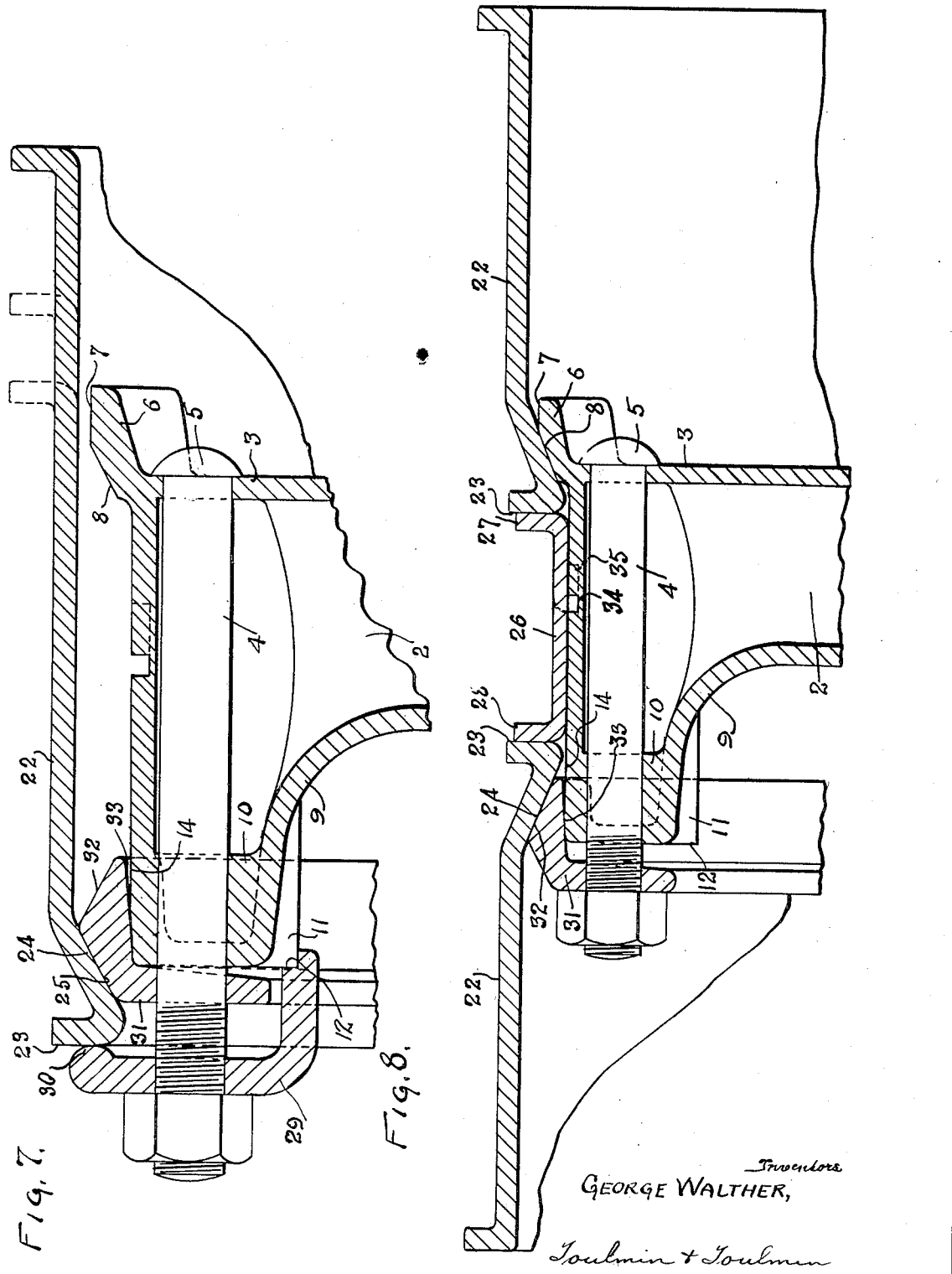

Patented Apr. 3, 1934

1,953,321

UNITED STATES PATENT OFFICE 1,953,321

WHEEL

George Walther, Dayton, Ohio, assignor to The Dayton Steel Foundry Company, Dayton, Ohio, a corporation of Ohio Application January 21, 1929, Serial No. 333,779

11 Claims. (Cl. 301—12)

My invention relates to wheels.

It is the object of my invention to provide a wheel adapted to support either single or dual rims for pneumatic tires.

It is a further object to provide rim retaining clamping lugs of the same form, size and shape adaptable for use with either dual or single pneumatic tire rims.

Referring to the drawings:

Figure 3 is a section on the line 3—3 of Figure 1;

Figure 4 is a section on the line 4—4 of Figure 2;

Figure 7 is a section on the line 7—7 of Figure 5;

Figure 8 is a section on the line 8—8 of Figure 6.

Figure 1:
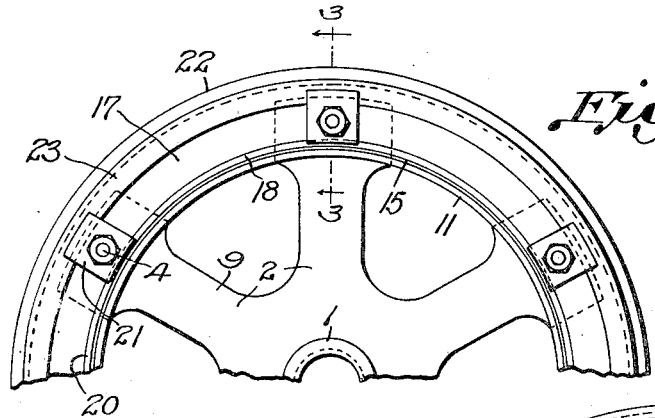
Figure 1 is an outboard elevation of one form of my wheel with a single rim mounted.
Figure 2:
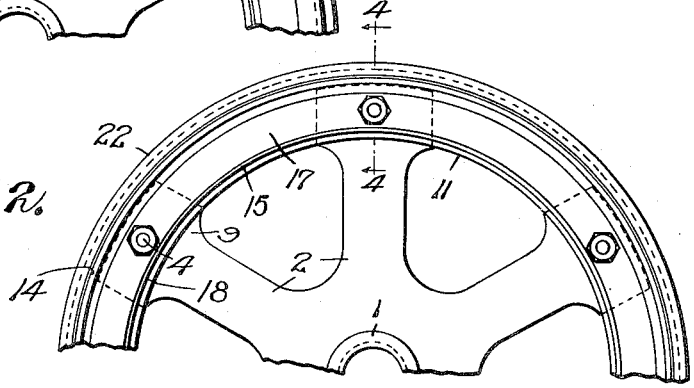
Figure 2 is a similar view with the dual rim mounted.

Referring to the drawings in detail, 1 is a hub and 2 indicates spokes.

It will be understood that if the spokes are made with a cast rim they will be made of cast steel, whereas if they are made of malleable iron, the hub and spokes will have free ends as it is not feasible to cast a wheel of malleable iron having an integral felloe rim.

In the embodiment shown, the inboard wall of the outer end of each spoke is projected radially outward in a straight line, as at 3, to receive the bolt 4 whose head 5 engages the outside of the spoke wall 3. The outer end of this spoke wall 3 is turned over laterally towards the vehicle as at 6 and is arranged with a flat peripheral surface 7 and a tapered surface 8.

The outboard side of the spoke end is turned laterally outwardly as at 9 and thence radially outwardly as at 10. The outboard face of the spoke is provided with a shoulder 11 having a tapered surface 12. The bolt 4 passes through the radially extending portion or wall 10. The radially outer end of this wall is provided with a tapered surface 13 and a flat surface 14. Mounted upon the tapered surfaces 12 and 13 are correspondingly tapered surfaces 15 and 16 of a wedge ring which consists of a vertical portion 17 mounted on the bolt 4 and diagonally disposed portions or shoulders 18 and 19. The tapered surface 15 of the diagonal portion 18 of the wedge ring when a single rim in place on the wheel rests upon the tapered surface 12 of the spoke while another tapered surface 25 of the portion 18 supports a rim lug having a tapered surface 20 forming a shoulder. The rim lug itself is designated 21. One edge of this rim lug 21 engages one edge of a tire rim 22 as at 23. This edge of the tire rim has a marginally disposed depending shoulder, the outboard face of which is designated 23 and the inboard tapered face of which is designated 24. This inboard tapered face rests upon the correspondingly tapered face 25 of the diagonally disposed portion 19 of the wedge ring.

When it is desired to mount two tires and two tire rims on this spoke, the arrangement is as shown in Figure 4 or Figure 8 depending upon the exact modification.

The two rims are arranged with their rim shoulders facing one another towards the center of the wheel.

It will be noted that the spoke end surfaces 7 and 14 are of different radial distances from the center of the wheel, the greater distance being on the inboard side of the wheel. The surface 8 of the spoke end wall supports surface 24 of the inboard side tire rim. The flat surface 14 of the spoke end will support the spacer ring 26 whose radially extending side walls 27 and 28 respectively engage the outer face 23 of the tire rim shoulders.

The wedge ring has been reversed in position so that the portion 18 now engages the surface 12 of the spoke ends.

The portion 19 now engages the surface 24 of the tire rim. The bolt 4 is arranged to pass through the spoke ends and the wedge ring in the usual manner.

Thus, the same spokes, tire rims and wedge ring may be employed for either single or dual pneumatic wheels.

Figure 5:
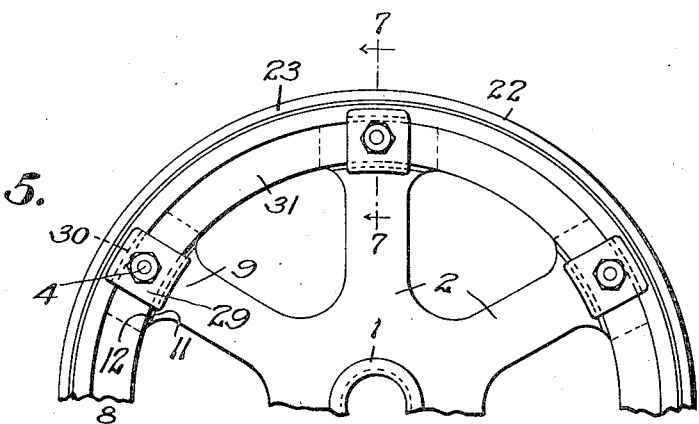
Figure 5 is an outboard elevation of a modified form of my wheel employing a single rim.
Figure 6:
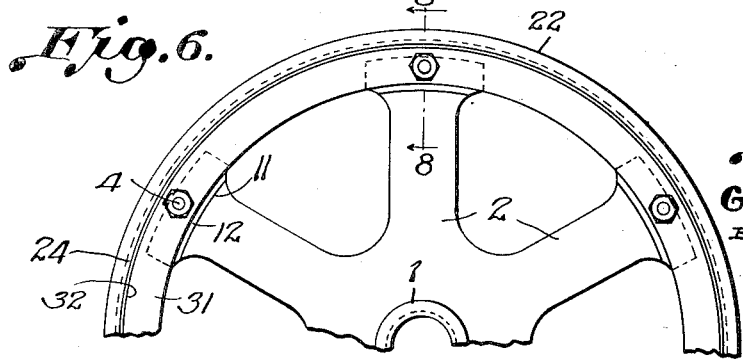
Figure 6 is a view of the same wheel with the same clamping lugs on which dual rims are mounted.

A slight modification of this general principle of construction is shown in Figures 5, 6, 7 and 8 where we have each spoke 2 with a radially extending inboard wall 3 with a laterally extending turned over edge 6 having a flat radially outer surface 7 and a tapered surface 8. The wall 3 supports the bolt 4 in the usual manner.

The outboard side of the spoke is provided with an extending wall 10 with a radially inwardly projecting shoulder 11 having a face 12 which is arranged in a slightly different position in this modification. The upper portion of the wall 10 is flat as at 14 and has no tapered surface ordinarily although this may be provided, if desired.

The bolt 4 carries a wedge ring 29, the laterally extending portion of which engages with the shoulder 11 on the face 12. Its radially outer edge as at 30 engages the outer face 23 of the tire rim while the inside tapered shoulder face 24 of the tire rim engages a corresponding tapered surface 25 of the wedge ring 31. This wedge ring is mounted on the bolt 4. The wedge ring is also provided with two correspondingly tapered faces 32 and a radially inner wedging face 33 that rests on the top face 14 of the spoke.

When it is desired to use the dual rims, as in Figure 8, one of the surfaces 32 of the lug 31 is used to engage the surface 24 of the outboard side rim while the edge 23 of this rim is engaged by the spacer ring 26 through the shoulder 28 while the shoulder 27 of the spacer ring engages the edge 23 of the inboard tire rim which now rides upon the surface 8 of the spoke. This spacer ring 26 may be provided with a struck-up series of lugs 34 which depend into the slots 35 of the spoke. When the two rims are used, it is unnecessary to use the ring lug 29.

It will be understood that I desire to comprehend within my invention such modifications as may be necessary to adapt it to varying conditions and uses.

Having thus fully described my invention, what I claim as new and desire to secure by Letters Patent, is:

1. In combination, a wheel having a plurality of spokes, each spoke having a tapered shoulder on the outboard side adjacent the end and a tapered face on the end thereof, a reversible wedge ring having a radially inwardly projecting portion, a laterally outwardly projecting portion with a tapered surface adapted to engage said tapered shoulder, in one position of said reversible wedge ring, and a laterally inwardly projecting portion with a tapered surface for engaging said tapered face on the spoke end, a tire rim having a radially inwardly projecting wedge ring shoulder engaging the peripheral tapered surface of said wedge ring, a rim lug engaging the outboard face of the rim shoulder, the outboard side of the wedge ring and the radially outer surface of the laterally outwardly projecting portion of the wedge ring, and a bolt passing through each of the spokes, the wedge ring and the rim lug.

2. In combination in a wheel, a hub having a plurality of spokes, each spoke having a shoulder adjacent its end, a wedge ring mounted on the ends of the spokes and on said shoulders, a bolt passing through the end of each spoke and through the wedge ring, a rim lug on each bolt, and a tire rim having a shoulder engaged by the wedge ring and the rim lugs, whereby the tire rim is held on the wheel.

3. In combination in a wheel, a hub having a plurality of spokes, each spoke having an end shoulder and a shoulder adjacent its end, a wedge ring having a radial portion and angularly disposed portions adapted to be supported on said shoulders, a bolt passing through the end of each of certain spokes and the radial portion of the wedge ring, a rim lug on each of said bolts, and a tire rim having a shoulder engaged by one of the angular portions of the wedge ring and the rim lugs, whereby the tire rim is held on the wheel.

4. In combination, a hub having a plurality of spokes, each spoke having a tapered shoulder and a tapered end, a wedge ring having a radially extending bolt-supported portion adapted to rest upon said shoulders and an angularly disposed portion, the radially inner face of said angularly disposed portion adapted to rest on the tapered ends of said spokes while the radially outer face is angular to engage a tire rim shoulder, said wedge ring having another angularly disposed shoulder, a tire rim having a shoulder to engage said angular face, and means resting on said other angularly disposed portion and engaging the tire rim shoulder to hold the wedge ring and the tire rim on the ends of the spokes.

5. In combination, a wheel having a hub and spokes with spaced outer ends, a tire rim, a removable and reversible ring having means on only one side for engaging said tire rim and for supporting said rim either wholly to one side of the spoke ends or across the spoke ends, and means for retaining said interchangeable ring on said spoke ends.

6. In combination, a wheel having a hub and spokes with spaced outer ends, a tire rim, a removable and reversible ring having means on only one side for engaging said tire rim and for supporting said rim either wholly to one side of the spoke ends or across the spoke ends, and means for retaining said interchangeable ring on said spoke ends, said spoke ends having tapered faces for supporting said ring in either position.

7. In combination in a wheel having spokes, each spoke having a tapered face and a shoulder, a solid wedge ring having a portion resting on said shoulders and an angularly disposed portion engaging the tapered faces, a tire rim and means cooperating with the angularly disposed portion to clamp the rim on the wedge ring.

8. In combination a wheel, of a hub and a plurality of spokes having spaced end walls, bolts mounted through said end walls, clamp means mounted on said bolts and engaging one of said spoke end walls of each spoke, a tire rim mounted upon and retained by said clamp means out of engagement with the other of said spoke walls, said rim being completely above said bolts, said clamp means including an unbroken ring and a plurality of rim lugs.

9. In a wheel, a hub and a plurality of spokes, each spoke having on the outboard edge of its end a tapered surface and a shoulder adjacent its end, means engaging said surfaces and said shoulders for clamping a demountable tire rim out of contact with the spokes, and detachable rim lugs supported by and cooperating with the last means to hold the rim in place.

10. In a wheel, in combination with a demountable rim having a shoulder on one edge, a wedge ring having a shoulder thereon around one side of the wheel, said wedge ring engaging said rim shoulder, means resting on said wedge ring shoulder and cooperating with the wedge ring to grip the first-named shoulder and hold the rim on the wheel, and means to clamp the wedge ring and said means to the rim shoulder and on the wheel, whereby one side of the rim is engaged and the rim is supported free from contact with the wheel.

11. An article of manufacture for use in holding one or a pair of demountable rims on spokes, a wedge ring having a vertical portion and oppositely inclined portions, each oppositely inclined portion having a spoke-engaging surface, and a second surface substantially parallel to the spoke-engaging surface.

GEORGE WALTHER.